US011500812B2

(12) United States Patent
Zhu et al.

(10) Patent No.: US 11,500,812 B2
(45) Date of Patent: Nov. 15, 2022

(54) INTERMEDIATE FILE PROCESSING METHOD, CLIENT, SERVER, AND SYSTEM

(71) Applicant: ALIBABA GROUP HOLDING LIMITED, Grand Cayman (KY)

(72) Inventors: Jiaji Zhu, Hangzhou (CN); Wenhui Yao, Hangzhou (CN); Wei Xie, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 1138 days.

(21) Appl. No.: 15/862,570

(22) Filed: Jan. 4, 2018

(65) Prior Publication Data

US 2018/0129668 A1 May 10, 2018

Related U.S. Application Data

(63) Continuation of application No. PCT/CN2016/087462, filed on Jun. 28, 2016.

(30) Foreign Application Priority Data

Jul. 8, 2015 (CN) .......................... 201510398346.6

(51) Int. Cl.
*G06F 16/11* (2019.01)
*G06F 16/17* (2019.01)
(Continued)

(52) U.S. Cl.
CPC .......... *G06F 16/122* (2019.01); *G06F 16/144* (2019.01); *G06F 16/17* (2019.01); *H04L 67/01* (2022.05); *H04L 67/06* (2013.01)

(58) Field of Classification Search
CPC ....... G06F 16/122; G06F 16/144; G06F 16/17
See application file for complete search history.

(56) References Cited

U.S. PATENT DOCUMENTS

| 5,682,507 A | 10/1997 | Phillips et al. |
| 6,973,657 B1 | 12/2005 | Ahmad et al. |

(Continued)

FOREIGN PATENT DOCUMENTS

| CN | 101493844 A | 7/2009 |
| CN | 102214184 A | 10/2011 |

(Continued)

OTHER PUBLICATIONS

PCT International Search Report and Written Opinion dated Oct. 9, 2016 issued in corresponding International Application No. PCT/CN2016/087462 (17 pgs.).

(Continued)

*Primary Examiner* — Kannan Shanmugasundaram
(74) *Attorney, Agent, or Firm* — Finnegan, Henderson, Farabow, Garrett & Dunner, LLP

(57) ABSTRACT

The present invention discloses an intermediate file processing method, client, server, and system, including: receiving, from a first client, a message of writing an intermediate file to a first server; requesting a second server to create cluster information of the intermediate file; after the cluster information is created, receiving the cluster information returned by the second server, wherein the cluster information includes a priority level; and sending the cluster information to the first client and a second client, wherein the intermediate file is uploaded to the first server by the first client, so that the intermediate file is written by the first server according to a local disk load and the priority level of the cluster information, and the intermediate file is read from the first server by the second client according to the cluster information. It is ensures that tasks of jobs of higher priority levels can be processed promptly, jobs of higher priority levels are prevented from being delayed, and disk load balance is maintained.

36 Claims, 11 Drawing Sheets

(51) Int. Cl.
    *G06F 16/14*     (2019.01)
    *H04L 67/01*     (2022.01)
    *H04L 67/06*     (2022.01)

(56) References Cited

U.S. PATENT DOCUMENTS

| | | | | |
|---|---|---|---|---|
| 2003/0236848 A1* | 12/2003 | Neiman | ............... | G06F 9/505 709/213 |
| 2010/0114848 A1* | 5/2010 | Mckelvie | ............ | G06F 16/2365 707/704 |
| 2015/0040134 A1* | 2/2015 | Leggette | ................. | G06F 16/10 718/103 |
| 2015/0150017 A1* | 5/2015 | Hu | ........................ | G06F 12/00 718/103 |

FOREIGN PATENT DOCUMENTS

| | | |
|---|---|---|
| CN | 102541460 A | 7/2012 |
| CN | 102694860 A | 9/2012 |
| CN | 102937964 A | 2/2013 |
| CN | 103401931 A | 11/2013 |
| WO | WO 2017/005116 A1 | 1/2017 |

OTHER PUBLICATIONS

First Chinese Search Report issued in corresponding Chinese Application No. 201510398346.6 dated Dec. 12, 2018 (2 pages).

* cited by examiner

INTERMEDIATE FILE PROCESSING METHOD, CLIENT, SERVER, AND SYSTEM

CROSS REFERENCE TO RELATED APPLICATION

The disclosure claims the benefits of priority to International Application No. PCT/CN2016/087462, filed Jun. 28, 2016, which is based on and claims the benefits of priority to Chinese Application No. 201510398346.6, filed Jul. 8, 2015, both of which are incorporated herein in their entireties.

BACKGROUND

In distributed data computing (for example, MapReduce, Spark), each data processing job contains multiple tasks, and each task performs a conversion operation on data. The conversion operation is generally implemented through concurrently processing different data slices by multiple task worker threads. A large amount of intermediate result data generally is exchanged among the task worker threads, and the intermediate result data can be accessed in the form of an intermediate file. Efficiently processing the intermediate file is a key technology of distributed data processing.

Conventionally, each task worker thread directly accesses a local file system of a server, stores an output intermediate file, and reports file location information to a job management node (e.g., a node responsible for managing task execution in a job). The job management node informs an intermediate file storage address to a next task of reading the intermediate file, and a next task worker thread remotely reads demanded intermediate file data through HTTP access. After execution of the job is completed, the job management node notifies an agent on each machine to delete the intermediate file of the job.

The local file system of each server can be directly accessed for the intermediate files. Some intermediate files may be large, or some servers/disks may have loaded a large number of intermediate files, which can result in an unbalanced load. The read/write schedules of the intermediate files cannot be dynamically adjusted according to the load of each server and disk. Although impacts caused by the long tail of the running time of some task worker threads can be reduced through backup instances, the fine-grained optimization cannot be achieved.

SUMMARY

The embodiments of the present disclosure provide an intermediate file processing method for a cluster management client. The method can include: receiving, from a first client, a message of writing an intermediate file to a first server; requesting a second server to create cluster information of the intermediate file; after the cluster information is successfully created, receiving the cluster information returned by the second server, wherein the cluster information includes the cluster name and priority level; and sending the cluster information to the first client and a second client, wherein the intermediate file is uploaded to the first server by the first client, so that the intermediate file is written by the first server according to a local disk load and the priority level of the cluster information, and the intermediate file is read from the first server by the second client according to the cluster information.

The embodiments of the present disclosure further provide an intermediate file processing method. The method can include: receiving, from a first client, a request of writing an intermediate file, the request including cluster information of the intermediate file, wherein the cluster information is created by a second server and provided to the first client and a second client via a cluster management client and wherein the cluster information includes a priority level; verifying the received cluster information; sending a message of successful verification to the first client, when the received cluster information is verified; and receiving the intermediate file uploaded by the first client, and writing the intermediate file according to a local disk load and the priority level of the cluster information.

The embodiments of the present disclosure further provide an intermediate file processing method for a second server. The method can include: creating cluster information according to a request from a cluster management client, wherein the cluster information is associated with an intermediate file written by a first client to a first server and includes a priority level; sending the cluster information to the cluster management client, wherein the cluster information is sent to the first client and a second client by the cluster management client, the intermediate file is uploaded to the first server by the first client, so that the intermediate file is written by the first server according to a local disk load and the priority level of the cluster information, and the intermediate file is read from the first server by the second client according to the cluster information.

The embodiments of the present disclosure further provide an intermediate file processing method for a first client. The method can include: sending, to a cluster management client, a message of writing an intermediate file to a first server, so that the cluster management client requests a second server to create cluster information of the intermediate file; receiving the cluster information returned by the cluster management client, wherein the cluster information includes a cluster name and a priority level; sending, to the first server, a request of writing the intermediate file, wherein the request includes the cluster information and the cluster information is verified by the first server; and writing the intermediate file to the first server after the cluster information is successfully verified by the first server, so that the first server writes the intermediate file according to a local disk load and the priority level of the cluster information.

The embodiments of the present disclosure further provide an intermediate file processing method for a second client and includes: receiving cluster information from a cluster management client, wherein the cluster information is associated with an intermediate file to be written to a first server, is created by a second server under a request from the cluster management client, and includes a priority level; based on the cluster information, querying from the first server disk write location information for the intermediate file corresponding to the cluster information, wherein the intermediate file is uploaded by a first client to the first server and written by the first server according to a local disk load and the priority level of the cluster information; and reading the intermediate file from the first server according to the write location information.

The embodiments of the present disclosure further provide an intermediate file processing client. The client can include: a first receiving module configured to receive, from a first client, a message of writing an intermediate file to a first server; a requesting module configured to request a second server to create cluster information of the intermediate file; a second receiving module configured to receive the cluster information returned by the second server after the cluster information is successfully created, wherein the cluster information includes a priority level; and a first sending module configured to send the cluster information to the first client and a second client, wherein the intermediate file is uploaded to the first server by the first client, so that the intermediate file is written by the first server according to a local disk load and the priority level of the cluster information, and the intermediate file is read from the first server by the second client according to the cluster information.

The embodiments of the present disclosure further provide an intermediate file processing server. The server can include: a fourth receiving module configured to receive, from a first client, a request of writing an intermediate file, the request including cluster information of the intermediate file, wherein the cluster information is created and sent by a second server to a cluster management client, then sent by the cluster management client to the first client and a second client, and includes a priority level; a verification module configured to verify the received cluster information; a third sending module configured to send a message of successful verification to the first client when the received cluster information is verified; and a first writing module configured to receive the intermediate file uploaded by the first client and write the intermediate file according to a local disk load and the priority level of the cluster information.

The embodiments of the present disclosure further provide an intermediate file processing server. The server can include: a creating module configured to create cluster information according to a request from a cluster management client, wherein the cluster information is associated with an intermediate file written by a first client to a first server, and the cluster information includes a priority level; and a seventh sending module configured to send the cluster information to the cluster management client, wherein the cluster information is sent to the first client and a second client by the cluster management client, the intermediate file is uploaded to the first server by the first client so that the intermediate file is written by the first server according to a local disk load and the priority level of the cluster information, and the intermediate file is read from the first server by the second client according to the cluster information.

The embodiments of the present disclosure further provide an intermediate file processing client. The client can include: an eighth sending module configured to send, to a cluster management client, a message of writing an intermediate file to a first server, so that the cluster management client requests a second server to create cluster information of the intermediate file; a seventh receiving module configured to receive the cluster information returned by the cluster management client, wherein the cluster information includes a priority level; a ninth sending module configured to send, to the first server, a request of writing the intermediate file, the request including the cluster information, and the first server verifies the cluster information; and a second writing module configured to write the intermediate file to the first server after the cluster information is successfully verified by the first server, so that the intermediate file is written by the first server according to a local disk load and the priority level of the cluster information.

The embodiments of the present disclosure further provide an intermediate file processing client. The client can include: an eighth receiving module configured to receive cluster information from a cluster management client, wherein the cluster information is associated with an intermediate file to be written to a first server, is created by a second server under a request from the cluster management client, and includes a priority level; a second querying module configured to query from the first server the disk write location information for the intermediate file corresponding to the cluster information, according to the cluster information, wherein the intermediate file is uploaded by a first client to the first server and written by the first server according to local disk load and the priority level of the cluster information; and a reading module configured to read the intermediate file from the first server according to the write location information.

The embodiments of the present disclosure further provide an intermediate file processing system. The system can include: a first client, a second client, a first server, a second server, and a cluster management client; before writing an intermediate file to the first server, the first client sends, to the cluster management client, a message of writing an intermediate file to the first server; the cluster management client requests the second server to create cluster information of the intermediate file, and sends the cluster information to the first client and the second client after receiving the cluster information returned by the second server; the cluster information includes a priority level; the first client requests the first server to write the intermediate file according to the cluster information, and uploads the intermediate file to the first server after receiving a message, returned by the first server, indicating that the cluster information has been successfully verified; the first server writes the intermediate file according to a local disk load and the priority level of the cluster information; and the second client reads the intermediate file from the first server according to the cluster information.

BRIEF DESCRIPTION OF THE DRAWINGS

The drawings are described herein for further understanding of the present disclosure, and are a part of the present disclosure. The exemplary embodiments of the present disclosure and the descriptions thereof are for illustration instead of improperly limiting the present disclosure. In the drawings.

DETAILED DESCRIPTION

The implementation of the present disclosure is illustrated in detail below with reference to embodiments and the accompanying drawings. In this way, how the present invention applies technical means to solve the technical problem and achieve technical effects can be fully understood and implemented accordingly.

In view of the above, the present disclosure provides an intermediate file processing method, client, server, and system to solve the above problems of failing to dynamically adjust read/write operations on intermediate files. The disclosed embodiments can achieve the following technical effects: ensuring that tasks of jobs of higher priority levels can be processed promptly, preventing jobs of higher priority levels from being delayed, and maintaining disk load balance. Any product implementing the present disclosure does not necessarily achieve all the above technical effects at the same time.

Figure 1:
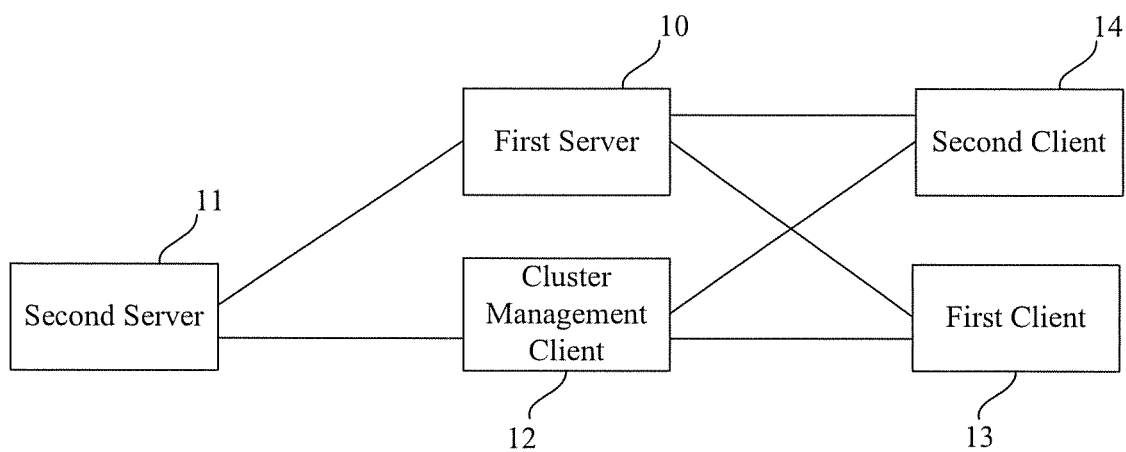
FIG. 1 is a schematic structural diagram of an intermediate file processing system according to some embodiments of the present disclosure.

FIG. 1 is a schematic topology diagram of an intermediate file processing system, according to embodiments of the present disclosure. The system can include a first server 10, a second server 11, a cluster management client 12, a first client 13, and a second client 14.

First client 13 can be configured to write an intermediate file to first server 10. And second client 14 can be configured to read the intermediate file from first server 10. In some embodiments, an overall job execution process can include multiple tasks. For example, first client 13 is an executor of an upper-level task, and second client 14 is an executor of a lower-level task. Second client 14 can be configured to read the intermediate file generated by first client 13, so as to perform subsequent processing.

First server 10 can be configured to store intermediate files and complete read/write operations of first client 13 and second client 14 on the intermediate file. Second server 11 can be configured to create and store cluster information of the intermediate files, and manage the intermediate files through the cluster information. Each piece of the cluster information has an expiration time. After the cluster information has expired, second server 11 can delete the expired cluster information. Second server 11 can synchronize the cluster information with first server 10 through back-end heartbeat signals, so that first server 10 deletes the intermediate file corresponding to the cluster information that has been deleted, thereby completing clearance of the intermediate file.

Cluster management client 12 can be configured to request second server 11 to create the cluster information, and periodically send a request of extending the expiration time of the cluster information to second server 11, to extend the life cycle of the cluster information. After second client 14 reads the intermediate file from first server 10, cluster management client 12 can be configured to update the expiration time of the cluster information of the intermediate file to a current time on second server 11, so that second server 11 can delete the cluster information of the intermediate file.

In the intermediate file processing system, the processes of writing and reading an intermediate file are as follows.

After completing task processing, first client 13 can upload result data in a form of an intermediate file to first server 10. For example, first client 13 can send, to the cluster management client 12, a message of writing the intermediate file to first server 10. The message can include an identifier of first client 13, a data volume of the intermediate file, and a user identification (ID) of the job process executed by first client 13. An identifier of first client 13 can be the task ID of a task executed by first client 13, and can be a unique number. For example, the task ID can be 1673. The data volume of the intermediate data file can be a predicted storage space to be occupied (for example, 1042 Kb). The user ID may be a character string including of numbers or letters.

After receiving the message from first client 13, cluster management client 12 can request second server 11 to create the cluster information of the intermediate file. For example, cluster management client 12 can send a request to second server 11, and the request can include the identifier of first client 13, the data volume of the intermediate file, and the user ID of the job process executed by first client 13.

After receiving the request, second server 11 can create cluster information. For example, during the creation of the cluster info nation, second server 11 can be configured to conduct verification according to the user ID, determine a priority level of task execution by the user represented by the user ID, generate a cluster name according to the identifier (e.g., task ID) of first client 13, add a random character string before and/or after the identifier of first client 13, and generate a globally unique cluster name. For example, the identifier of first client can be 1673, and a globally unique cluster name can be bcd_1673. Second server 11 can be further configured to determine a storage space quota according to the data volume of the intermediate file; and generate a default expiration time (for example, 30 minutes) from the current time. Therefore, the created cluster information can include at least one of: a cluster name, an expiration time, a priority level, and a storage space quota. For example, the cluster name can be bvd_1673, the expiration time can be 6:35 (current time 6:05), the priority level can be 1, and the storage space quota can be 1042 Kb. After the cluster information is created, second server 11 backs up and stores the cluster information in a local disk, and sends the cluster information to cluster management client 12.

After receiving the cluster information returned by second server 11, cluster management client 12 can send the cluster information to first client 13, and send the cluster information to second client 14. Second client 14 can use the intermediate file to perform subsequent processing, according to the job execution process.

First client 13 can send, to first server 10, a request of writing the intermediate file, and the request of writing the intermediate file can include the cluster information to be verified by first server 10. First server 10 can verify whether the cluster information exists on second server 11. When the cluster information exists on second server 11, first server 10 can send a message of successful verification to first client 13. When the verification fails, the writing of the intermediate file by first client 13 can be stopped. For example, first server 10 verifies whether the cluster information "cluster name: bcd_1673; expiration time: 6:35 (current time 6:05); priority level: 1; and storage space quota: 1042 Kb" exists in second server 11, and sends a message to first client 13 after a successful verification. And first client 13 can upload the intermediate file corresponding to the cluster information to first server 10.

After receiving the intermediate file uploaded by first client 13, first server 10 can write the intermediate file to a disk with less work load, according to local disk load. Thus, the load of local disks can be balanced. When multiple first clients 13 require writing intermediate files, first server 11 can adjust the writing order according to the priority level in the cluster information sent by each first client 13. Intermediate files having higher priority levels can be written first, thereby ensuring that tasks of jobs having higher priority levels can be processed promptly and preventing jobs having higher priority levels from being delayed.

After receiving the cluster information, second client 14 can periodically query, from first server 10, the write location in a disk of the intermediate file corresponding to the cluster information. For example, a query can be sent to first server 10 at an interval of 30 seconds, and the sent query can include the cluster information. After querying the write location information of the intermediate file corresponding to the cluster information, first server 10 can send the write location information to second client 14. Second client 14 can read the intermediate file written by first client 13 from first server 10, according to the queried write location information. When multiple second clients 14 read intermediate files at a same time, intermediate files having higher priority levels in the cluster information can be read first by corresponding second clients 14, so that the reading order of the intermediate files is adjusted according to the writing order. Thus, tasks of jobs having higher priority levels can be processed promptly, thereby preventing the jobs having higher priority levels from being delayed.

Before the intermediate file uploaded by first client 13 is completely read by second client 14, cluster management client 12 can further update the expiration time of the cluster information on second server 11 at an interval of a first preset time length. Therefore, the life cycle of the cluster information can be extended. For example, the first preset time length is 5 minutes, and the expiration time of the cluster information can be extended by 5 minutes when the expiration time is renewed. The time length by which the expiration time is extended can be preset in the submitted job execution process. Generally, the time length can be set as a maximum period for deleting generated intermediate files after an abnormity occurs in cluster management client 12 that submits the job execution process. That is, if cluster management client 12 can recover within that period, the generated intermediate files may not be deleted, job execution can continue and the cluster information of the intermediate files may not be deleted due to expiration. If cluster management client 12 does not recover within that period, the expiration time of the cluster information may not be updated on second server 11, so that second server 11 can delete the expired cluster information and first server 10 can delete the corresponding intermediate files. Therefore, cluster management client 12 updates the expiration time of the cluster information at an interval of a first preset time length on second server 11. Thus, the intermediate files may not be deleted due to expiration of the corresponding cluster information and can be successfully read by second client 14.

After successfully reading all the data of the intermediate file, second client 14 can send, to cluster management client 12, a message indicating that the intermediate file has been successfully read. The message can include the cluster name in the cluster information of the intermediate file. For example, cluster name can be bcd_1673, as in the above example. Cluster management client 12 can update the expiration time of the cluster information corresponding to the cluster name to the current time on second server 11.

Thus, the cluster information can immediately expire in second server 11 and can be cleared. Second server 11 can delete the cluster information and synchronize the locally stored cluster information to first server 10 through back-end heartbeats. After determining that the cluster information has been deleted in the second server 11, first server 10 can delete the intermediate file corresponding to the cluster information. For example, after second server 11 deletes the cluster information "cluster name: bcd_1673; expiration time: 6:35 (current time 6:05); priority level: 1; and storage space quota: 1042 Kb," first server 10 can delete the intermediate file corresponding to the cluster information, so that the disk storage space can be released and disk load can be reduced.

In the intermediate file processing system according to embodiments of the present disclosure, cluster management client 12 can restart due to a fault during processing. After the restart, cluster management client 12 can query whether the cluster information still exists in second server 11, to determine whether execution of the current service should be continued. Cluster management client 12 can send the identifier of first client 13 to second server 11, and second server 11 can query, according to the identifier of first client 13, whether there is a cluster name containing the identifier of first client 13 in the stored cluster information. Thus, whether the cluster information corresponding to the intermediate file uploaded by the first client 13 still exists can be determined. For example, the cluster management client 12 can upload the identifier "1673" of first client 13, and second server 11 can then query whether a cluster name containing "1673" exists in the stored cluster information. When a cluster name "bcd_1673" is found, it indicates that the cluster information has not expired after cluster management client 12 restarted. When no cluster name containing "1673" is found, the cluster information should expire and can be deleted by second server 11 after cluster management client 12 restarts.

When it is found by the query that the corresponding cluster information still exists, cluster management client 12 can update the expiration time of the cluster information on second server 11, so that the cluster information does not expire. Therefore, the intermediate file corresponding to the cluster information may not be deleted by first server 10, and the intermediate file processing system can continue to execute the current job. When the corresponding cluster information cannot be found by query, it indicates that the intermediate file corresponding to the cluster information has been deleted by first server 10. Therefore, cluster management client 12 can re-submit the current job process, and the current job can be re-executed. When an anomaly occurs in the current job, the intermediate file processing system can promptly recover the corresponding intermediate file and release disk space, and it can continue to execute the current job if the current job recovers from the anomaly in a short time.

First server 10 sends the usage information for the intermediate file corresponding to the cluster information to second server 11 at an interval of a second preset time length. For example, the usage information for the intermediate file corresponding to the cluster information is sent at an interval of one minute. The usage information includes information such as the quantity of intermediate files, occupied storage space, and utilization rate of the storage space quota, so that second server 11 can learn the global use condition of the intermediate file corresponding to each piece of cluster information, and can provide an interface for cluster management client 12 queries.

Figure 2:
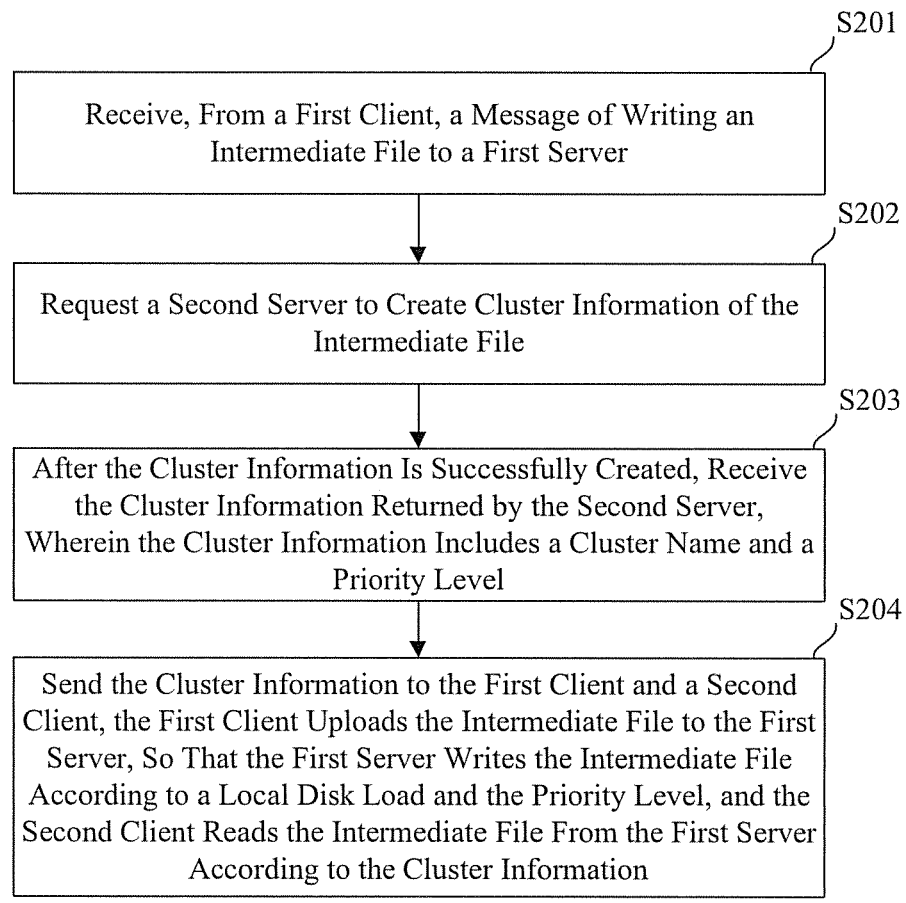
FIG. 2 is a schematic flow chart of an intermediate file processing method according to some embodiments of the present disclosure.

In the intermediate file processing system, some embodiments of the present disclosure provide an intermediate file processing method for the cluster management client, and as shown in FIG. 2, the method includes the following steps S201-S204.

In step S201, a message of writing an intermediate file to a first server is received from a first client.

In step S202, a second server is requested to create cluster information of the intermediate file.

In Step S203, after the cluster information is successfully created, the cluster information returned by the second server is received, wherein the cluster information includes a cluster name and a priority level.

In step S204, the cluster information is sent to the first client and the second client, where the first client uploads the intermediate file to the first server so that the first server writes the intermediate file according to local disk load and the priority level, and the second client reads the intermediate file from the first server according to the cluster information.

In some embodiments, the cluster information further includes an expiration time. The expiration time of the cluster information can be updated on the second server at an interval of a first preset time length, to extend the life cycle of the cluster information.

A message indicating that the intermediate file has been successfully read from the first server can be received from the second client. And the second server can be informed to update the expiration time to the current time, so that the second server can delete the cluster information, and the first server deletes the intermediate file corresponding to the cluster information.

After reboot, the cluster management client can send the identifier of the first client to the second server, to query whether the cluster information of the intermediate file exists. When the cluster information of the intermediate file exists, execution of the current job can continue. When the cluster information of the intermediate file does not exist, the current job can be re-initialized and then executed.

Figure 3:
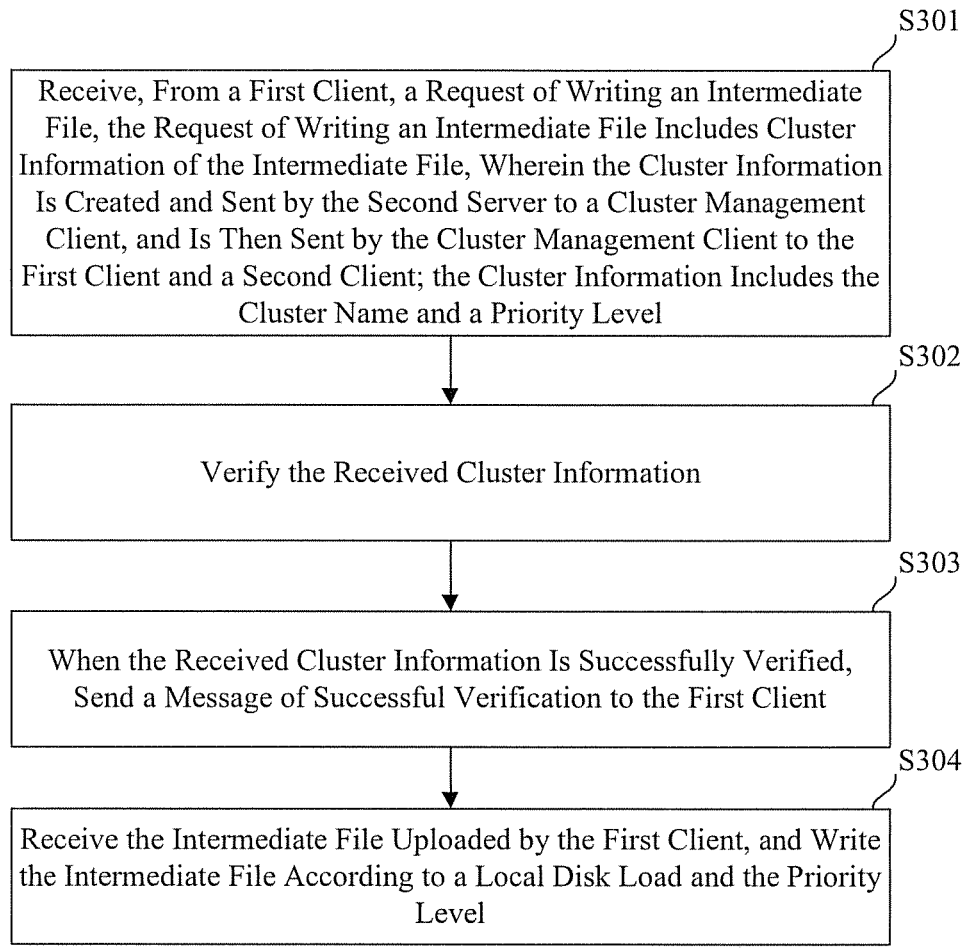
FIG. 3 is a schematic flow chart of an intermediate file processing method according to some embodiments of the present disclosure.

In the intermediate file processing system, some embodiments of the present disclosure provide an intermediate file processing method for the first server, and as shown in FIG. 3, the method includes the following steps S301-S304.

In step S301, a request of writing an intermediate file can be received from the first client, and the request of writing an intermediate file includes the cluster information of the intermediate file. The cluster information can be created and sent by the second server to the cluster management client, and then sent by the cluster management client to the first client and the second client. The cluster information can include a cluster name and a priority level.

In step S302, the received cluster information can be verified.

In step S303, when the received cluster information is successfully verified, a message of successful verification can be sent to the first client.

In step S304, the intermediate file uploaded by the first client can be received, and the intermediate file can be written according to local disk load and the priority level.

A write location of the intermediate file corresponding to the cluster information can be sent to the second client according to a query request from the second client, wherein the query request includes the cluster information.

The intermediate file corresponding to the cluster information can be sent to the second client according to a read request from the second client, wherein the read request includes the write location.

Usage information for the intermediate file corresponding to the cluster information can be sent to the second server at an interval of a second preset time length.

The cluster information further includes an expiration time. The intermediate file processing method further includes: synchronizing the cluster information stored in the second server; and when the cluster information of the intermediate file has been deleted by the second server, deleting the intermediate file corresponding to the cluster information.

Figure 4:
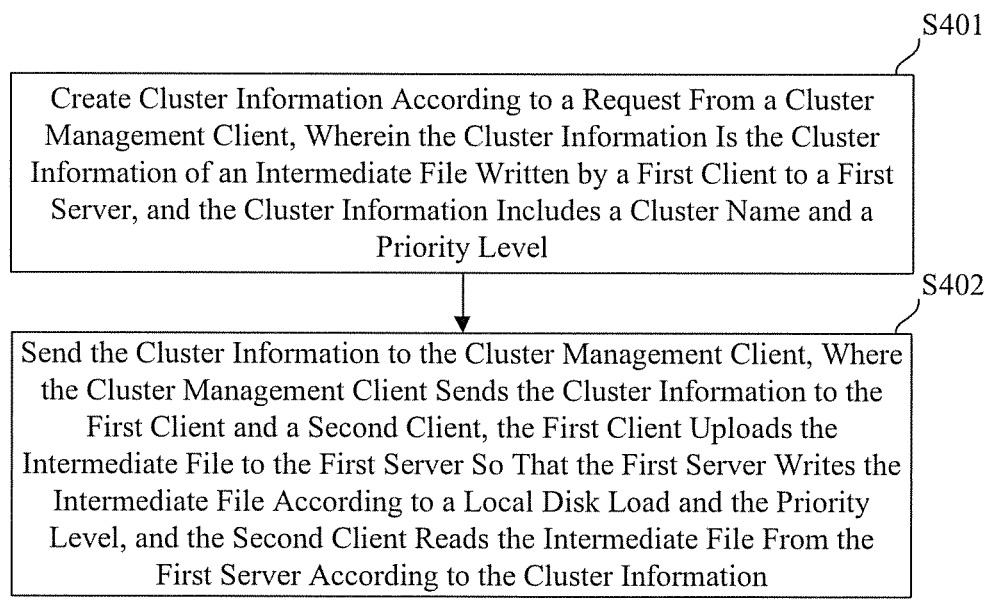
FIG. 4 is a schematic flow chart of an intermediate file processing method according to some embodiments of the present disclosure.

In the intermediate file processing system, some embodiments of the present disclosure provide an intermediate file processing method for the second server, and as shown in FIG. 4, the method includes the following steps S401-SS402.

In step S401, cluster information can be created according to a request from the cluster management client. The cluster information is associated with an intermediate file written by the first client to the first server, and the cluster information includes the cluster name and priority level.

In step S402, cluster information can be sent to the cluster management client, the cluster management client can send the cluster information to the first client and the second client. The first client can upload the intermediate file to the first server, so that the first server writes the intermediate file according to local disk load and the priority level, and the second client reads the intermediate file from the first server according to the cluster information.

In some embodiments, the cluster information further includes an expiration time. The expiration time can be updated on the cluster management client at an interval of a first preset time length, to extend the life cycle of the cluster information.

After the second client successfully reads the intermediate file from the first server, the expiration time can be updated to the current time by the cluster management client. And the cluster information of the intermediate file can be deleted.

The locally stored cluster information can be synchronized to the first server, so that when the cluster information of the intermediate file has been deleted, the first server deletes the intermediate file corresponding to the cluster information.

Usage information for the intermediate file corresponding to the cluster information can be received from the first server at an interval of a second preset time length.

After the cluster management client reboots, the identifier of the first client can be received from the cluster management client. The presence of the cluster information is queried according to the identifier of the first client. A query result can be returned to the cluster management client, so that the cluster management client determines whether to continue the execution of the current job.

Figure 5:
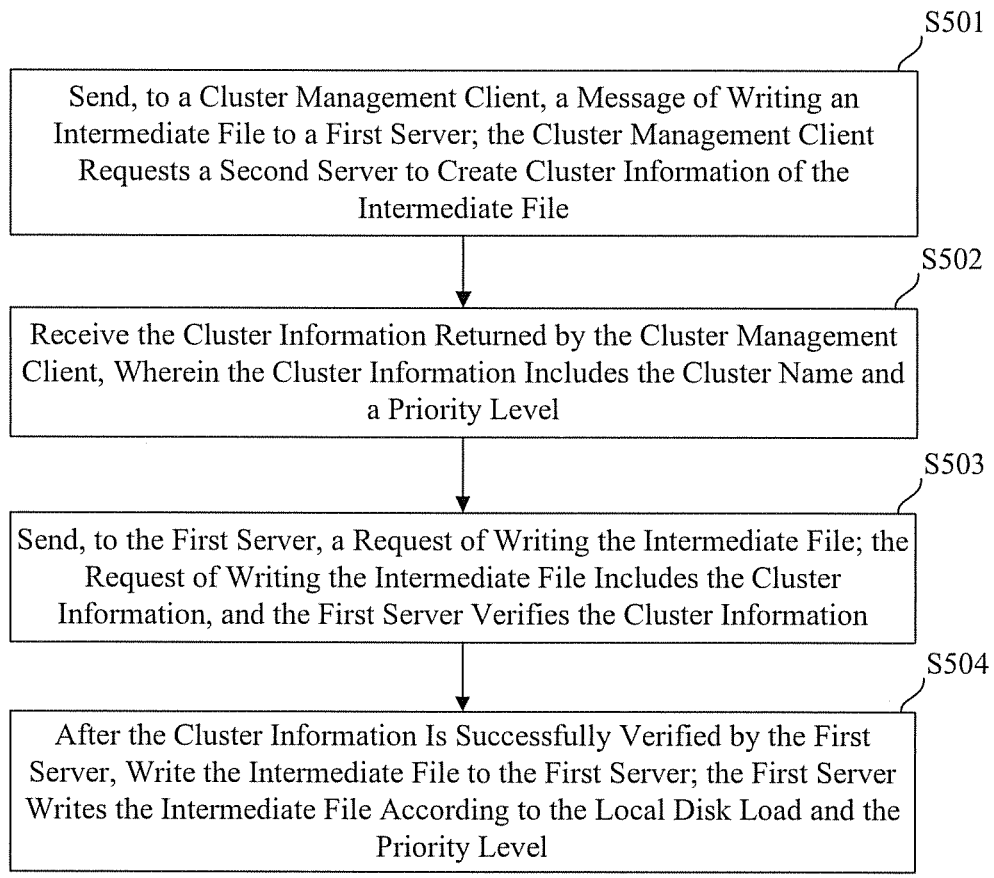
FIG. 5 is a schematic flow chart of an intermediate file processing method according to some embodiments of the present disclosure.

In the intermediate file processing system, some embodiments of the present disclosure provide an intermediate file processing method for the first client. As shown in FIG. 5, the method includes the following steps S501-S504.

In step S501, a message of writing an intermediate file to the first server is sent to the cluster management client, so that the cluster management client requests the second server to create cluster information of the intermediate file.

In step S502, the cluster information returned by the cluster management client is received, wherein the cluster information includes the cluster name and priority level.

In step S503, a request of writing the intermediate file is sent to the first server, the request of writing the intermediate file includes the cluster information, and the cluster information is verified by the first server.

In step S504, after the cluster information is successfully verified by the first server, the intermediate file can be written to the first server, so that the first server writes the intermediate file according to the local disk load and the priority level.

Figure 6:
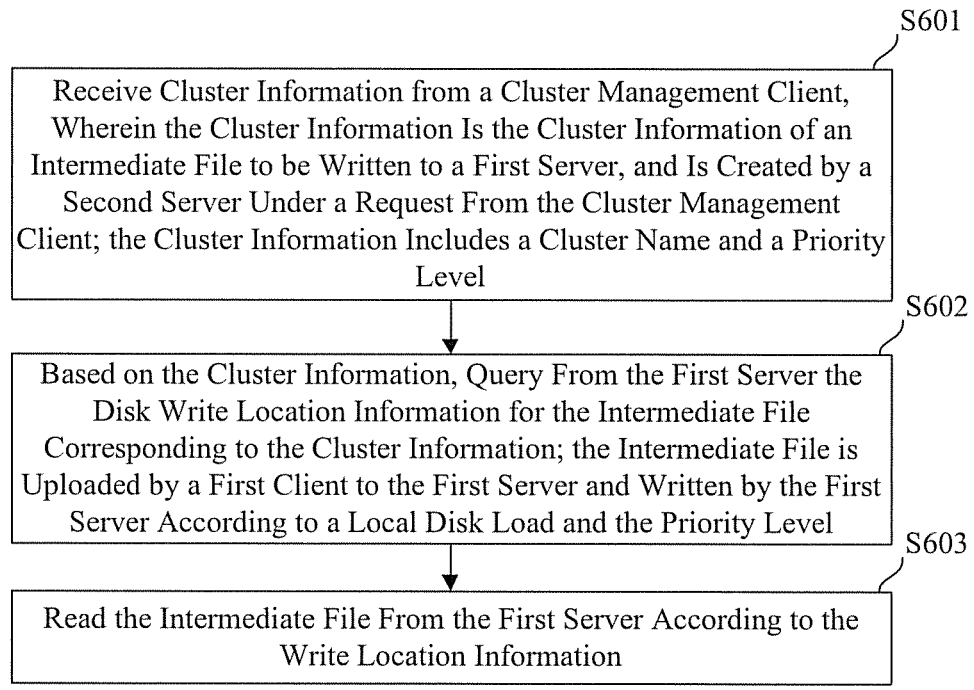
FIG. 6 is a schematic flow chart of an intermediate file processing method according to some embodiments of the present disclosure.

In the intermediate file processing system, some embodiments of the present disclosure provide an intermediate file processing method for the second client. As shown in FIG. 6, the method includes the following steps S601-S603.

In step S601, cluster information can be received from the cluster management client, wherein the cluster information is associated with an intermediate file to be written to the first server, and is created by the second server under a request from the cluster management client. The cluster information includes a cluster name and a priority level.

In step S602, disk write location information for the intermediate file corresponding to the cluster information can be queried from the first server according to the cluster information, and the intermediate file can be uploaded by the first client to the first server and be written by the first server according to the local disk load and the priority level.

In step S603, the intermediate file can be read from the first server according to the write location information.

In some embodiments, the cluster information further includes an expiration time.

A message indicating that the intermediate file has been successfully read can be sent to the cluster management client, and the cluster management client can update the expiration time of the second server to the current time, so that the second server can delete the cluster information, and the first server can delete the intermediate file corresponding to the cluster information.

In the intermediate file processing methods respectively applicable to the cluster management client, the first server, the second server, the first client, and the second client, the implementation of each step has been illustrated in the embodiment of the intermediate file processing system consisting of the above members, and the details will not be repeated herein.

Figure 7:
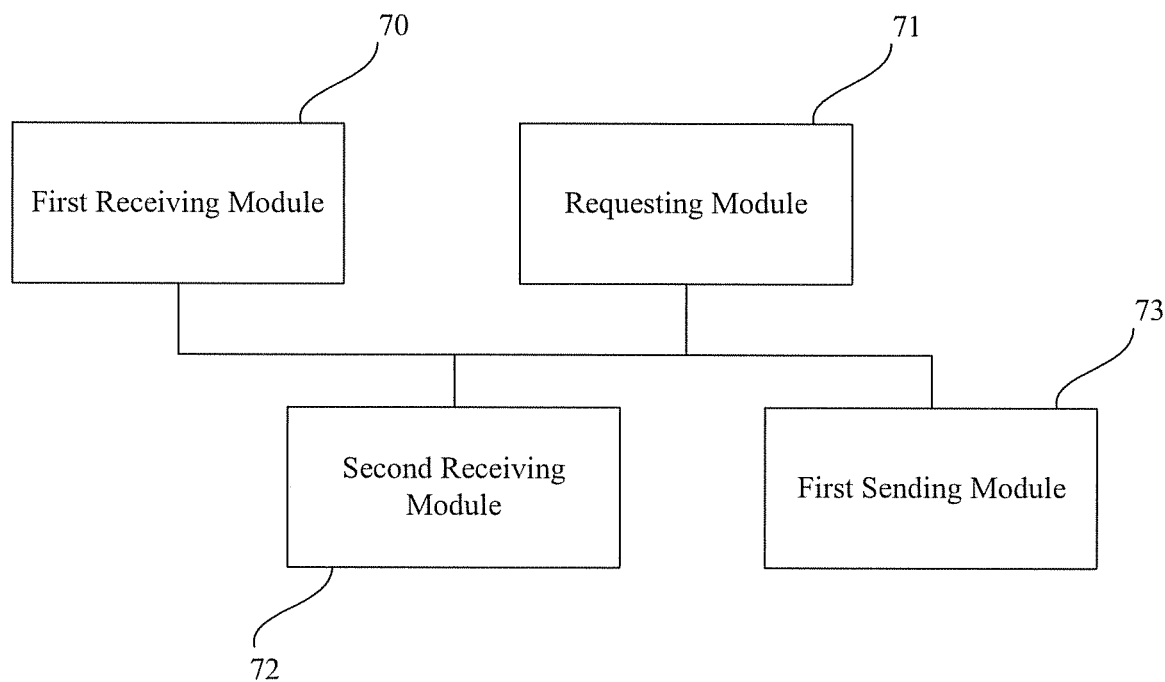
FIG. 7 is a schematic structural diagram of an intermediate file processing client according to some embodiments of the present disclosure.

FIG. 7 illustrates an intermediate file processing client according to some embodiments of the present disclosure. The intermediate file processing client can include: a first receiving module 70, a requesting module 71, a second receiving module 72, and a first sending module 73.

First receiving module 70 can be configured to receive, from a first client, a message of writing an intermediate file to a first server.

Requesting module 71 can be configured to request a second server to create cluster information of the intermediate file.

Second receiving module 72 can be configured to receive the cluster information returned by the second server after the cluster information is successfully created, wherein the cluster information includes a cluster name and a priority level.

First sending module 73 can be configured to send the cluster information to the first client and a second client. The first client can upload the intermediate file to the first server, so that the first server can write the intermediate file according to a local disk load and the priority level, and the second client can read the intermediate file from the first server according to the cluster information.

In some embodiments, the cluster information further includes an expiration time, and the client further includes a first updating module, a third receiving module, a second updating module, a second sending module, a first execution module, and a second execution module.

The first updating module can be configured to update the expiration time of the cluster information on the second server at an interval of a first preset time length, to extend the life cycle of the cluster information.

The third receiving module can be configured to receive, from the second client, a message indicating that the intermediate file has been successfully read from the first server.

The second updating module can be configured to update the expiration time of the second server to the current time, so that the second server can delete the cluster information, and the first server can delete the intermediate file corresponding to the cluster information;

The second sending module can be configured to send the identifier of the first client to the second server, after a reboot, to query whether the cluster information of the intermediate file exists.

The first execution module can be configured to continue execution of the current job when the cluster information of the intermediate file exists.

The second execution module can be configured to re-initialize the current job when the cluster information of the intermediate file does not exist.

Figure 8:
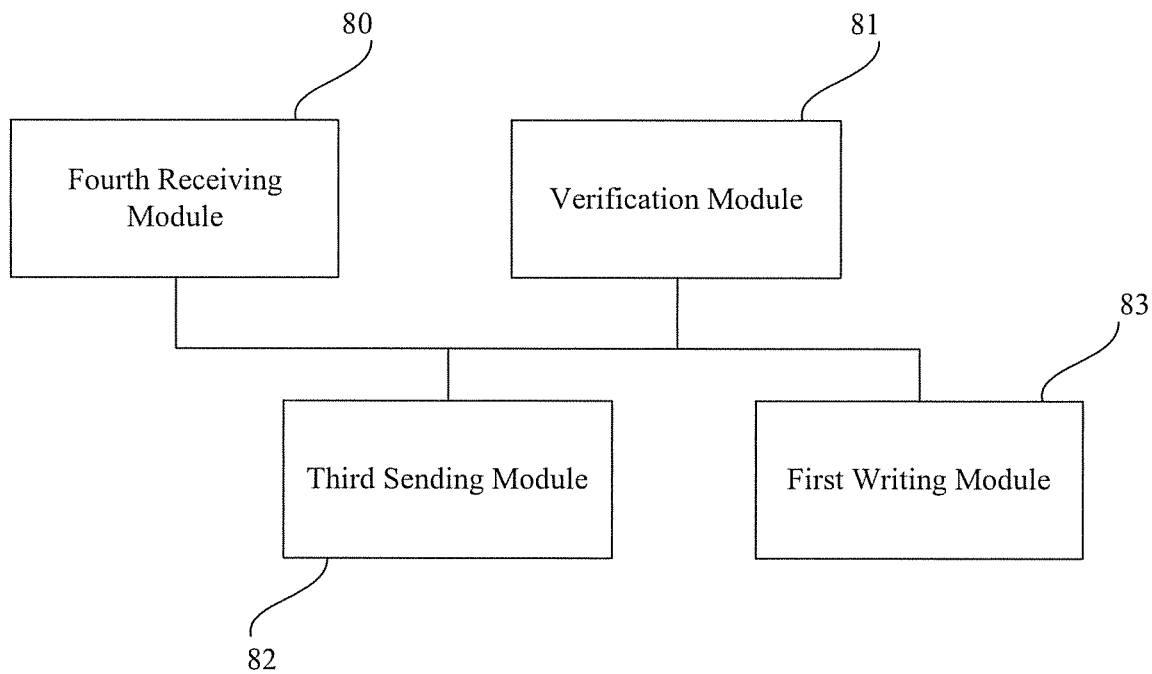
FIG. 8 is a schematic structural diagram of an intermediate file processing server according to some embodiments of the present disclosure.

FIG. 8 illustrates an intermediate file processing server according to some embodiments of the present disclosure. The intermediate file processing server can include a fourth receiving module 80, a verification module 81, a third sending module 82, and a first writing module 83.

Fourth receiving module 80 can be configured to receive, from a first client, a request of writing an intermediate file. The request of writing an intermediate file can include the cluster information of the intermediate file. The cluster information can be created and sent by a second server to a cluster management client, and be then sent by the cluster management client to the first client and a second client. The cluster information can include a cluster name and a priority level. In some embodiments, the cluster information further includes an expiration time.

Verification module 81 can be configured to verify the received cluster information.

Third sending module 82 can be configured to send a message of successful verification to the first client when the received cluster information is successfully verified.

First writing module 83 can be configured to receive the intermediate file uploaded by the first client and write the intermediate file according to a local disk load and the priority level.

The server further includes a fourth sending module, a fifth sending module, a sixth sending module, a first synchronization module, a first synchronization module, and a first deleting module.

The fourth sending module can be configured to send the write location of the intermediate file corresponding to the cluster information to the second client, according to a query request from the second client. The query request includes the cluster information.

The fifth sending module can be configured to send the intermediate file corresponding to the cluster information to the second client, according to a read request from the second client, wherein the read request includes the write location;

The sixth sending module can be configured to send usage information for the intermediate file corresponding to the cluster information to the second server at an interval of a second preset time length;

The first synchronization module can be configured to synchronize the cluster information stored in the second server.

The first deleting module can be configured to delete the intermediate file corresponding to the cluster information, when the cluster information of the intermediate file has been deleted by the second server.

Figure 9:
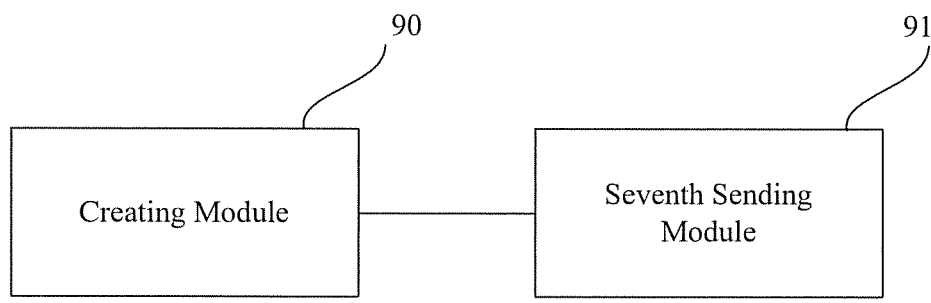
FIG. 9 is a schematic structural diagram of an intermediate file processing server according to some embodiments of the present disclosure.

FIG. 9 illustrates an intermediate file processing server according to some embodiments of the present disclosure. The intermediate file processing server can include: a creating module 90 and a seventh sending module 91.

Creating module 90 can be configured to create cluster information according to a request from a cluster management client. The cluster information is associated with an intermediate file written by a first client to a first server, and the cluster information includes a cluster name and a priority level.

Seventh sending module 91 can be configured to send the cluster information to the cluster management client. The cluster management client can send the cluster information to the first client and a second client. The first client can upload the intermediate file to the first server, so that the first server writes the intermediate file according to a local disk load and the priority level. And the second client reads the intermediate file from the first server according to the cluster information.

In some embodiments, the cluster information further includes an expiration time. And the server further includes a third updating module, a fourth updating module, a second deleting module, a second synchronization module, a fifth receiving module, a sixth receiving module, a first querying module, and a feedback module.

The third updating module can be configured to update the expiration time according to the cluster management client at an interval of a first preset time length, to extend the life cycle of the cluster information.

The fourth updating module can be configured to update the expiration time to the current time on the cluster management client, after the second client successfully reads the intermediate file from the first server.

The second deleting module can be configured to delete the cluster information of the intermediate file.

The second synchronization module can be configured to synchronize the locally stored cluster information to the first server, so that when the cluster information of the intermediate file has been deleted, the first server deletes the intermediate file corresponding to the cluster information.

The fifth receiving module can be configured to receive usage information for the intermediate file corresponding to the cluster information from the first server at an interval of a second preset time length;

The sixth receiving module can be configured to receive the identifier of the first client from the cluster management client, after the cluster management client reboots.

The first querying module can be configured to query whether the cluster information exists according to the identifier of the first client.

The feedback module can be configured to return a query result to the cluster management client, so that the cluster management client determines whether to continue execution of the current job.

Figure 10:
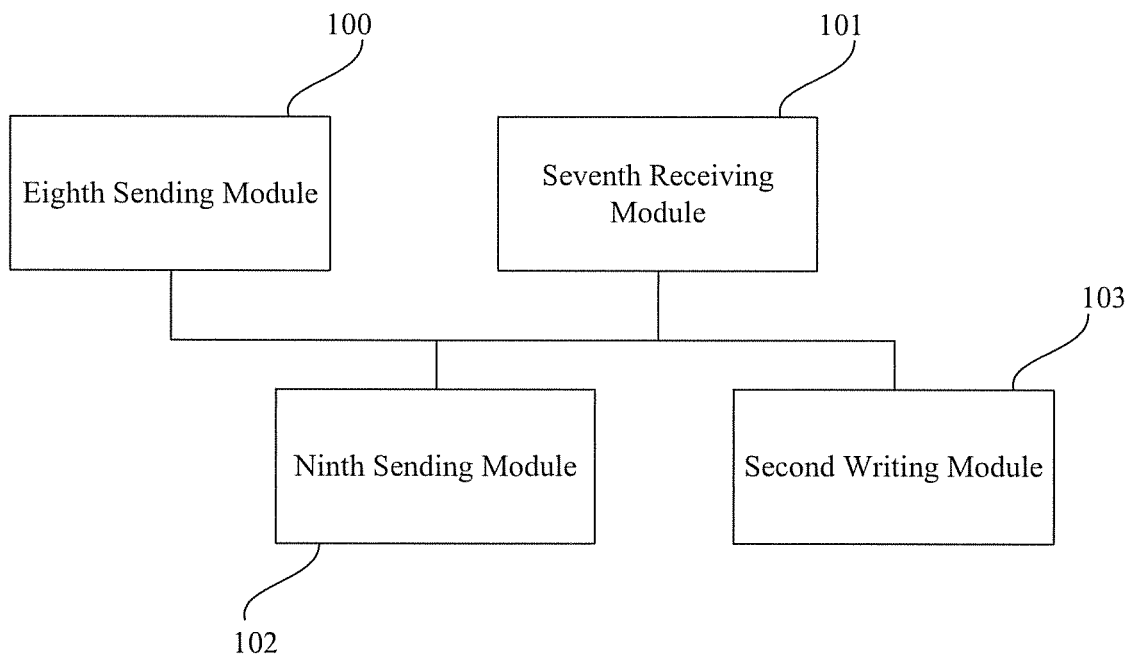
FIG. 10 is a schematic structural diagram of an intermediate file processing client according to some embodiments of the present disclosure.

FIG. 10 illustrates an intermediate file processing client according to some embodiments of the present disclosure. The intermediate file processing client can include: an eighth sending module 100, a seventh receiving module 101, a ninth sending module 102, and a second writing module 103.

Eighth sending module 100 can be configured to send, to a cluster management client, a message of writing an intermediate file to a first server, so that the cluster management client requests a second server to create cluster information of the intermediate file.

Seventh receiving module 101 can be configured to receive the cluster information returned by the cluster management client. The cluster information can include a cluster name and a priority level.

Ninth sending module 102 can be configured to send, to the first server, a request of writing the intermediate file. The request of writing the intermediate file can include the cluster information, and the first server can verify the cluster information.

Second writing module 103 can be configured to write the intermediate file to the first server after the cluster information is successfully verified by the first server, so that the first server writes the intermediate file to a disk according to a local disk load and the priority level.

Figure 11:
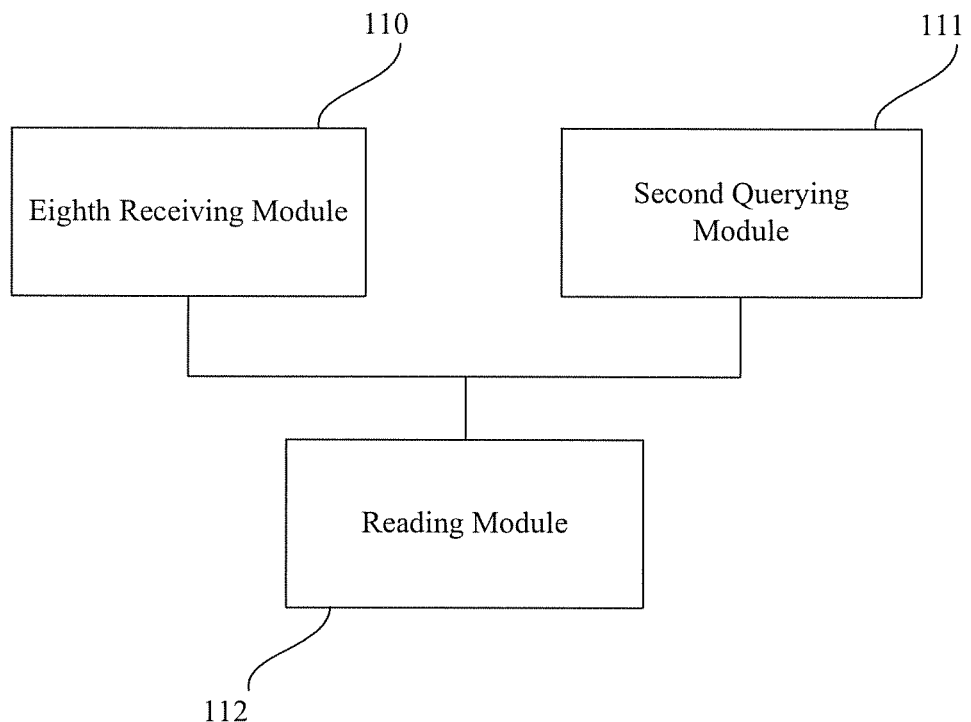
FIG. 11 is a schematic structural diagram of an intermediate file processing client according to some embodiments of the present disclosure.

FIG. 11 illustrates an intermediate file processing client according to some embodiments of the present disclosure. The intermediate file processing client can include: an eighth receiving module 110, a second querying module 111, and a reading module 112.

Eighth receiving module 110 can be configured to receive cluster information from a cluster management client. The cluster information is associated with an intermediate file to be written to a first server, and is created by a second server under a request from the cluster management client. The cluster information includes a cluster name and a priority level.

Second querying module 111 can be configured to query from the first server the disk write location information for the intermediate file corresponding to the cluster information, according to that cluster information. The intermediate file can be uploaded by a first client to the first server and written by the first server according to a local disk load and the priority level.

Reading module 112 can be configured to read the intermediate file from the first server according to the write location information.

In some embodiments, the cluster information further includes an expiration time, and the client further includes: a tenth sending module.

The tenth sending module can be configured to send, to the cluster management client, a message indicating that the intermediate file has been successfully read. Thereby, the cluster management client can update the expiration time of the second server to the current time. The second server can delete the cluster information, and the first server can delete the intermediate file corresponding to the cluster information.

The intermediate file processing system provided by the embodiment of the present disclosure is further illustrated below through an application instance.

Multiple job processes may be executed at the same time on a cloud-computing platform. Each job process can include multiple tasks. For intermediate result data between the tasks, the intermediate result data can be written to the first server in the form of an intermediate file after one task has been executed, and be read from the first server in a next task.

The cluster management client can submit three job processes Job1, Job2, and Job3. The user ID corresponding to Job1 is SamZhang, the user ID corresponding to Job2 is SissiLi, and the user ID corresponding to Job3 is LeoZhao. Each job process has a first client that has executed a current task and a second client that can continue to execute a next task. The first client writes an intermediate file to the first server, and the second client reads the intermediate file from the first server.

Job1 includes a first client that has executed Task 1147 ("1147" is a task ID) and a second client that continues to execute Task 1148. Job2 includes a first client that has executed Task 1214 and a second client that continues to execute Task 1215. Job3 includes a first client that has executed Task 1359 and a second client that continues to execute Task 1360.

For Job1, the first client that has executed Task 1147 writes intermediate file A to the first server. It sends, to the cluster management client, a message of writing the intermediate file to the first server. The message includes the identifier 1147 of the first client, the data volume 2264 Kb of the intermediate file A, and the user ID SamZhang. For Job2, the first client that has executed Task 1214 writes an intermediate file B to the first server. It sends, to the cluster management client, a message of writing the intermediate file to the first server; the message includes the identifier 1214 of the first client, the data volume 3376 Kb of the intermediate file B, and the user ID SissiLi. For Job3, the first client that has executed Task 1359 writes an intermediate file C to the first server. It sends, to the cluster management client, a message of writing the intermediate file to the first server; the message includes the identifier 1359 of the first client, the data volume 4043 Kb of the intermediate file C, and the user ID LeoZhao. The cluster management client requests the second server to create cluster information for intermediate file A, intermediate file B, and intermediate file C, and the request also includes the above information.

The second server starts to create corresponding cluster information after receiving the request from the cluster management client. The second server generates cluster names according to the identifiers of the first clients, and respectively generates the cluster names abcd_1147, efgh_1214, and ijkl_1359; determines priority levels respectively according to the user IDs, wherein the priority level corresponding to user ID SamZhang is 2, the priority level corresponding to user ID SissiLi is 3, and the priority level corresponding to user ID LeoZhao is 1; determines storage space quotas respectively according to the data volumes of the intermediate files; and generates default an expiration time. For example, expiration time=current time+30 minutes. Therefore, when the current time is 5:06:50, the expiration time of the created cluster information is 5:36:50. The cluster information created by the second server for intermediate file A, intermediate file B, and intermediate file C can be respectively as below.

Cluster information for intermediate file A: "abcd_1147, 5:36:50, 2, 2264 Kb";

Cluster information for intermediate file B: "efgh_1214, 5:36:50, 3, 3376 Kb";

Cluster information for intermediate file C: "ijkl_1359, 5:36:50, 1, 4043 Kb".

The second server sends the created cluster information to the cluster management client. The cluster management client sends the cluster information of intermediate file A to the first client that has executed Task 1147 and the second client that continues to execute Task 1148, sends the cluster information of intermediate file B to the first client that has executed Task 1214 and the second client that continues to execute Task 1215, and sends the cluster information of intermediate file C to the first client that has executed Task 1359 and the second client that continues to execute Task 1360, respectively.

The first client that has executed Task 1147, the first client that has executed Task 1214, and the first client that has executed Task 1359 respectively send requests of writing intermediate file A, intermediate file B, and intermediate file C to the first server. The requests of writing the intermediate files respectively include the cluster information of intermediate file A, the cluster information of intermediate file B, and the cluster information of intermediate file C. After receiving the cluster information, the first server performs verification with the second server according to the cluster names, and returns messages of successful verification to the three first clients after the cluster information is successfully verified. After receiving the messages of successful verification, the three first clients respectively upload intermediate file A, intermediate file B, and intermediate file C to the first server.

When writing the received intermediate file, the first server writes the intermediate file to a disk with a lighter load according to the current disk load conditions, and determines the writing order according to the priority level in the cluster information of each intermediate file. The priority level in the cluster information of intermediate file C is 1, the priority level in the cluster information of intermediate file A is 2, and the priority level in the cluster information of intermediate file B is 3. Therefore, the first server writes intermediate file C first, then writes intermediate file A, and finally writes intermediate file B. In this way, it is ensured that tasks of jobs of higher priority levels can be processed promptly, and jobs of higher priority levels are prevented from being delayed.

After receiving cluster information from the cluster management client, the second client that continues to execute Task 1148, the second client that continues to execute Task 1215, and the second client that continues to execute Task 1360 periodically query the write locations of the corresponding intermediate files from the first server according to the cluster information. Because intermediate file C of priority level 1 in the cluster information is written first, the second client that continues to execute Task 1360 finds by query the write location of intermediate file C first, and the second client that continues to execute Task 1360 reads intermediate file C from the first server according to the queried write location. Then, the second client that continues to execute Task 1148 finds by query the write location of intermediate file A, and reads intermediate file A from the first server. Afterward, the second client that continues to execute Task 1215 finds by query the write location of intermediate file B, and reads intermediate file B from the first server. The writing order of the intermediate files is adjusted through priority levels, and the reading order of the intermediate files can be adjusted accordingly, so tasks of higher priority levels can be processed first. After successfully reading the corresponding intermediate files, the three second clients respectively send, to the cluster management client, messages indicating that the intermediate files have been successfully read, and the sent messages include the cluster names abcd_1147, efgh_1214, and ijkl_1359 in the cluster information of the read intermediate files, respectively.

Based on the three received cluster names, the cluster management client updates the expiration times of the corresponding three pieces of cluster information to the current time on the second server, so that the cluster information of intermediate file A, intermediate file B, and intermediate file C is immediately expired, and the second server deletes the corresponding three pieces of cluster information. After the second server deletes the corresponding cluster information, it synchronizes the locally stored cluster information to the first server. After finding that the cluster information corresponding to intermediate file A, intermediate file B, and intermediate file C has been deleted by the second server, the first server deletes intermediate file A, intermediate file B, and intermediate file C stored in a local disk. Therefore, the storage space of the first server and the second server is released, and the intermediate files generated during the job execution process can be promptly cleared.

In a typical configuration, a computation device includes one or more Central Processing Units (CPUs), I/O interfaces, network interfaces, and internal memory.

The internal memory may include computer readable media such as volatile memory, Random Access Memory (RAM), and/or non-volatile memory, e.g., Read-Only Memory (ROM) or flash RAM, and so on. The internal memory is an example of a computer readable medium.

Computer readable media include permanent, nonpermanent, mobile and immobile media, which can implement information storage through any method or technology. The information may be computer readable instructions, data structures, program modules or other data. Examples of computer storage media include, but are not limited to, Phase-change RAM (PRAM), Static RAM (SRAM), Dynamic RAM (DRAM), other types of Random Access Memory (RAM), Read-Only Memory (ROM), Electrically Erasable Programmable Read-Only Memory (EEPROM), flash memory or other internal memory technologies, Compact Disk Read-Only Memory (CD-ROM), Digital Versatile Discs (DVDs) or other optical memory, cassettes, cassette and disk memory or other magnetic memory devices or any other non-transmission media, which can be used for storing information that can be accessed by the computation device. As defined here, computer readable media does not include transitory computer readable media, such as modulated data signals and carriers.

Some terms are used to refer to particular components in the specification and claims. Persons skilled in the art should understand that hardware manufacturers may call the same component different names. In the specification and claims, components are not distinguished by differences in name but by differences in function. For example, in the specification and claims of the text, "including" is an open term, and can be explained as "including but not limited to". "Approximately" means that within an acceptable range of error, persons skilled in the art can solve the technical problem within a certain range of error to basically achieve the technical effects. In addition, the term "coupling" includes any direct or indirect electrical coupling means. Therefore, if it is described in the text that a first device is coupled to a second device, this means that the first device can be directly electrically coupled to the second device, or indirectly electrically coupled to the second device through other devices or coupling means. Preferred embodiments of the present invention are described subsequently in the specification, and are intended to illustrate the general principle of the present invention, instead of limiting the scope of the present invention. The protection scope of the present invention shall be subject to the scope defined by the appended claims.

It should be noted that the terms "include," "contain," or any other variations are intended to cover non-exclusive inclusions, such that a commodity or system including a series of elements not only includes those elements, but also includes other elements that are not listed specifically, or also includes elements that are inherent in this commodity or system. Given no further limitations, the element defined by a sentence "including a . . . " does not preclude the presence of other similar elements in a commodity or system that includes the listed element.

Several preferred embodiments of the present invention are presented and described above, and as mentioned before, it should be understood that the present invention is not limited to the form disclosed in the text and shall not exclude other embodiments. The present invention can be applied in other combinations, modifications, and environments, and can be varied using technologies or knowledge mentioned above or in the related art within the concept of the invention. The variations and changes made by persons skilled in the art do not depart from the spirit and scope of the present invention, and shall fall within the protection scope of the appended claims of the present invention.

What is claimed is:

1. An intermediate file processing method for a cluster management client, comprising:
   receiving, from a first client, a message of writing an intermediate file to a first server;
   requesting a second server to create cluster information of the intermediate file;
   receiving the cluster information returned by the second server after the cluster information is created, wherein the cluster information comprises a priority level and an expiration time;
   sending the cluster information to the first client and a second client; and
   updating the expiration time of the cluster information at an interval of a preset time length, by periodically sending a request for extending the expiration time of the cluster information to the second server, to extend the life cycle of the cluster information,
   wherein the intermediate file is uploaded to the first server by the first client, so that the intermediate file is written by the first server according to a local disk load and the priority level of the cluster information, and the intermediate file is read from the first server by the second client according to the cluster information.

2. The method of claim 1, further comprising:
   receiving, from the second client, a message indicating that the intermediate file has been read from the first server; and
   updating the expiration time to the current time on the second server, so that the second server deletes the cluster information, and the first server deletes the intermediate file corresponding to the cluster information.

3. The method of claim 1, further comprising:
   after a reboot of the cluster management client, sending the identifier of the first client to the second server, to query whether the cluster information of the intermediate file exists;
   when the cluster information of the intermediate file exists, continuing to execute the current job; and
   when the cluster information of the intermediate file does not exist, re-initializing the current job.

4. An intermediate file processing method for a first server, comprising:
   receiving, from a first client, a request of writing an intermediate file, the request including cluster information of the intermediate file, wherein the cluster information is created by a second server and provided to the first client and a second client via a cluster management client and wherein the cluster information includes a priority level and an expiration time;

verifying the received cluster information;
sending a message of successful verification to the first client, when the received cluster information is verified; and
receiving the intermediate file uploaded by the first client, and writing the intermediate file according to a local disk load and the priority level of the cluster information,
wherein the expiration time of the cluster information is updated at an interval of a first preset time length, based on a request for extending the expiration time of the cluster information that is periodically sent to the second server, to extend the life cycle of the cluster information.

5. The method of claim 4, further comprising:
sending a write location of the intermediate file corresponding to the cluster information to the second client, according to a query request from the second client, wherein the query request comprises the cluster information; and
sending the intermediate file corresponding to the cluster information to the second client according to a read request from the second client, wherein the read request comprises the write location.

6. The method of claim 4, further comprising:
sending usage information for the intermediate file corresponding to the cluster information to the second server at an interval of a second preset time length.

7. The method of claim 4, wherein the cluster information further includes an expiration time, and the method further comprises:
synchronizing the cluster information stored in the second server; and
when the cluster information of the intermediate file has been deleted by the second server, deleting the intermediate file corresponding to the cluster information.

8. An intermediate file processing method for a second server, comprising:
creating cluster information according to a request from a cluster management client, wherein the cluster information is associated with an intermediate file written by a first client to a first server and includes a priority level and an expiration time;
sending the cluster information to the cluster management client, wherein the cluster information is sent to the first client and a second client by the cluster management client, the intermediate file is uploaded to the first server by the first client, so that the intermediate file is written by the first server according to a local disk load and the priority level of the cluster information, and the intermediate file is read from the first server by the second client according to the cluster information; and
wherein the expiration time of the cluster information is updated at an interval of a first preset time length, based on a request for extending the expiration time of the cluster information that is periodically sent to the second server, to extend the life cycle of the cluster information.

9. The method of claim 8, further comprising:
updating the expiration time to the current time on the cluster management client after the second client successfully reads the intermediate file from the first server; and
deleting the cluster information of the intermediate file.

10. The method of claim 8, further comprising:
synchronizing the locally stored cluster information to the first server, so that when the cluster information of the intermediate file has been deleted, the first server deletes the intermediate file corresponding to the cluster information.

11. The method of claim 8, further comprising:
receiving usage information for the intermediate file corresponding to the cluster information from the first server at an interval of a second preset time length.

12. The method of claim 8, further comprising:
receiving an identifier of the first client from the cluster management client after the cluster management client reboots;
querying whether the cluster information exists according to the identifier of the first client; and
returning a query result to the cluster management client, so that the cluster management client determines whether to continue executing the current job.

13. An intermediate file processing method for a first client, comprising:
sending, to a cluster management client, a message of writing an intermediate file to a first server, so that the cluster management client requests a second server to create cluster information of the intermediate file;
receiving the cluster information returned by the cluster management client, wherein the cluster information includes a cluster name, a priority level, and an expiration time;
sending, to the first server, a request of writing the intermediate file, wherein the request includes the cluster information and the cluster information is verified by the first server; and
writing the intermediate file to the first server after the cluster information is successfully verified by the first server, so that the first server writes the intermediate file according to a local disk load and the priority level of the cluster information,
wherein the expiration time of the cluster information is updated at an interval of a preset time length, based on a request for extending the expiration time of the cluster information that is periodically sent to the second server, to extend the life cycle of the cluster information.

14. An intermediate file processing method for a second client, comprising:
receiving cluster information from a cluster management client, wherein the cluster information is associated with an intermediate file to be written to a first server, is created by a second server under a request from the cluster management client, and includes a priority level and an expiration time;
based on the cluster information, querying from the first server disk write location information for the intermediate file corresponding to the cluster information, wherein the intermediate file is uploaded by a first client to the first server and written by the first server according to a local disk load and the priority level of the cluster information;
reading the intermediate file from the first server according to the write location information; and
wherein the expiration time of the cluster information is updated at an interval of a preset time length, based on a request for extending the expiration time of the cluster information that is periodically sent to the second server, to extend the life cycle of the cluster information.

15. The method of claim 14, further comprising:

sending, to the cluster management client, a message indicating that the intermediate file has been successfully read; and updating, by the cluster management client, the expiration time to a current time on the second server, so that the second server deletes the cluster information, and the first server deletes the intermediate file corresponding to the cluster information.

16. An intermediate file processing client, comprising:
a memory storing a set of instructions; and
a processor configured to execute the set of instructions to:
receive, from a first client, a message of writing an intermediate file to a first server;
request a second server to create cluster information of the intermediate file;
receive the cluster information returned by the second server after the cluster information is successfully created, wherein the cluster information includes a priority level and an expiration time; and
send the cluster information to the first client and a second client,
wherein the intermediate file is uploaded to the first server by the first client, so that the intermediate file is written by the first server according to a local disk load and the priority level of the cluster information, and the intermediate file is read from the first server by the second client according to the cluster information, and
wherein the expiration time of the cluster information is updated at an interval of a preset time length, based on a request for extending the expiration time of the cluster information that is periodically sent to the second server, to extend the life cycle of the cluster information.

17. An intermediate file processing server, comprising:
a memory storing a set of instructions; and
a processor configured to execute the set of instructions to:
receive, from a first client, a request of writing an intermediate file, the request including cluster information of the intermediate file, wherein the cluster information is created and sent by a second server to a cluster management client,
then sent by the cluster management client to the first client and a second client, and includes a priority level and an expiration time;
verify the received cluster information;
send a message of successful verification to the first client when the received cluster information is verified; and
receive the intermediate file uploaded by the first client and write the intermediate file according to a local disk load and the priority level of the cluster information,
wherein the expiration time of the cluster information is updated at an interval of a preset time length, based on a request for extending the expiration time of the cluster information that is periodically sent to the second server, to extend the life cycle of the cluster information.

18. An intermediate file processing server, comprising:
a memory storing a set of instructions; and
a processor configured to execute the set of instructions to:
create cluster information according to a request from a cluster management client, wherein the cluster information is associated with an intermediate file written by a first client to a first server, and the cluster information includes a priority level and an expiration time; and
send the cluster information to the cluster management client,
wherein the cluster information is sent to the first client and a second client by the cluster management client, the intermediate file is uploaded to the first server by the first client so that the intermediate file is written by the first server according to a local disk load and the priority level of the cluster information, and the intermediate file is read from the first server by the second client according to the cluster information, and
wherein the expiration time of the cluster information is updated at an interval of a preset time length, based on a request for extending the expiration time of the cluster information that is periodically sent to the second server, to extend the life cycle of the cluster information.

19. An intermediate file processing client, comprising:
a memory storing a set of instructions; and
a processor configured to execute the set of instructions to:
send, to a cluster management client, a message of writing an intermediate file to a first server, so that the cluster management client requests a second server to create cluster information of the intermediate file;
receive the cluster information returned by the cluster management client, wherein the cluster information includes a priority level and an expiration time;
send, to the first server, a request of writing the intermediate file, the request including the cluster information, and the first server verifies the cluster information; and
write the intermediate file to the first server after the cluster information is successfully verified by the first server, so that the intermediate file is written by the first server according to a local disk load and the priority level of the cluster information,
wherein the expiration time of the cluster information is updated at an interval of a preset time length, based on a request for extending the expiration time of the cluster information that is periodically sent to the second server, to extend the life cycle of the cluster information.

20. An intermediate file processing client, comprising:
a memory storing a set of instructions; and
a processor configured to execute the set of instructions to:
receive cluster information from a cluster management client, wherein the cluster information is associated with an intermediate file to be written to a first server, is created by a second server under a request from the cluster management client, and includes a priority level and an expiration time;
query from the first server the disk write location information for the intermediate file corresponding to the cluster information, according to the cluster information, wherein the intermediate file is uploaded by a first client to the first server and written by the first server according to local disk load and the priority level of the cluster information;
read the intermediate file from the first server according to the write location information; and
wherein the expiration time of the cluster information is updated at an interval of a preset time length, based on a request for extending the expiration time of the cluster information that is periodically sent to the second server, to extend the life cycle of the cluster information.

21. An intermediate file processing system, comprising: a first client, a second client, a first server, a second server, and a cluster management client, each of the first client, the second client, the first server, the second server, and the cluster management client comprising at least one processor;
before writing an intermediate file to the first server, the first client sends, to the cluster management client, a message of writing an intermediate file to the first server; the cluster management client requests the second server to create cluster information of the intermediate file, and sends the cluster information to the first client and the second client after receiving the cluster information returned by the second server; the cluster information includes a priority level and an expiration time;
the first client requests the first server to write the intermediate file according to the cluster information, and uploads the intermediate file to the first server after receiving a message, returned by the first server, indicating that the cluster information has been successfully verified;
the first server writes the intermediate file according to a local disk load and the priority level of the cluster information; and
the second client reads the intermediate file from the first server according to the cluster information,
wherein the expiration time of the cluster information is updated at an interval of a preset time length, based on a request for extending the expiration time of the cluster information that is periodically sent to the second server, to extend the life cycle of the cluster information.

22. A non-transitory computer readable medium that stores a set of instructions that is executable by at least one processor of an electronic device to cause the device to perform an intermediate file processing method for a cluster management client, the method comprising:
receiving, from a first client, a message of writing an intermediate file to a first server;
requesting a second server to create cluster information of the intermediate file;
receiving the cluster information returned by the second server after the cluster information is created, wherein the cluster information comprises a cluster name, a priority level, and an expiration time;
sending the cluster information to the first client and a second client, wherein the intermediate file is uploaded to the first server by the first client, so that the intermediate file is written by the first server according to a local disk load and the priority level of the cluster information, and the intermediate file is read from the first server by the second client according to the cluster information; and
updating the expiration time of the cluster information on the second server at an interval of a preset time length, by periodically sending a request for extending the expiration time of the cluster information to the second server, to extend the life cycle of the cluster information.

23. The non-transitory computer readable medium of claim 22, wherein the set of instructions is executable by the at least one processor of the device to cause the device to further perform:

receiving, from the second client, a message indicating that the intermediate file has been read from the first server; and
updating the expiration time to the current time on the second server, so that the second server deletes the cluster information, and the first server deletes the intermediate file corresponding to the cluster information.

24. The non-transitory computer readable medium of claim 22, wherein the set of instructions is executable by the at least one processor of the device to cause the device to further perform:
after a reboot of the cluster management client, sending the identifier of the first client to the second server, to query whether the cluster information of the intermediate file exists;
when the cluster information of the intermediate file exists, continuing to execute the current job; and
when the cluster information of the intermediate file does not exist, re-initializing the current job.

25. A non-transitory computer readable medium that stores a set of instructions that is executable by at least one processor of an electronic device to cause the device to perform an intermediate file processing method for a first server, the method comprising:
receiving, from a first client, a request of writing an intermediate file, the request including cluster information of the intermediate file, wherein the cluster information is created and sent by a second server to a cluster management client, and is then sent by the cluster management client to the first client and a second client, the cluster information includes a cluster name and a priority level and an expiration time;
verifying the received cluster information;
sending a message of successful verification to the first client, when the received cluster information is verified; and
receiving the intermediate file uploaded by the first client, and writing the intermediate file according to a local disk load and the priority level of the cluster information,
wherein the expiration time of the cluster information is updated at an interval of a first preset time length, based on a request for extending the expiration time of the cluster information that is periodically sent to the second server, to extend the life cycle of the cluster information.

26. The non-transitory computer readable medium of claim 25, wherein the set of instructions is executable by the at least one processor of the device to cause the device to further perform:
sending a write location of the intermediate file corresponding to the cluster information to the second client, according to a query request from the second client, wherein the query request comprises the cluster information; and
sending the intermediate file corresponding to the cluster information to the second client according to a read request from the second client, wherein the read request comprises the write location.

27. The non-transitory computer readable medium of claim 25, wherein the set of instructions is executable by the at least one processor of the device to cause the device to further perform:
sending usage information for the intermediate file corresponding to the cluster information to the second server at an interval of a second preset time length.

28. The non-transitory computer readable medium of claim 25, wherein the cluster information further includes an expiration time, and the set of instructions is executable by the at least one processor of the device to cause the device to further perform:

synchronizing the cluster information stored in the second server; and when the cluster information of the intermediate file has been deleted by the second server, deleting the intermediate file corresponding to the cluster information.

29. A non-transitory computer readable medium that stores a set of instructions that is executable by at least one processor of an electronic device to cause the device to perform an intermediate file processing method for a second server, the method comprising:

creating cluster information according to a request from a cluster management client, wherein the cluster information is associated with an intermediate file written by a first client to a first server and includes a cluster name and a priority level and an expiration time; and sending the cluster information to the cluster management client, wherein the cluster information is sent to the first client and a second client by the cluster management client, the intermediate file is uploaded to the first server by the first client, so that the intermediate file is written by the first server according to a local disk load and the priority level of the cluster information, and the intermediate file is read from the first server by the second client according to the cluster information, and wherein the expiration time of the cluster information is updated at an interval of a first preset time length, based on a request for extending the expiration time of the cluster information that is periodically sent to the second server, to extend the life cycle of the cluster information.

30. The non-transitory computer readable medium of claim 29, wherein the set of instructions is executable by the at least one processor of the device to cause the device to further perform:

updating the expiration time to the current time on the cluster management client after the second client successfully reads the intermediate file from the first server; and deleting the cluster information of the intermediate file.

31. The non-transitory computer readable medium of claim 29, wherein the set of instructions is executable by the at least one processor of the device to cause the device to further perform:

synchronizing the locally stored cluster information to the first server, so that when the cluster information of the intermediate file has been deleted, the first server deletes the intermediate file corresponding to the cluster information.

32. The non-transitory computer readable medium of claim 29, wherein the set of instructions is executable by the at least one processor of the device to cause the device to further perform:

receiving usage information for the intermediate file corresponding to the cluster information from the first server at an interval of a second preset time length.

33. The non-transitory computer readable medium of claim 29, wherein the set of instructions is executable by the at least one processor of the device to cause the device to further perform:

receiving an identifier of the first client from the cluster management client after the cluster management client reboots;

querying whether the cluster information exists according to the identifier of the first client; and returning a query result to the cluster management client, so that the cluster management client determines whether to continue executing the current job.

34. A non-transitory computer readable medium that stores a set of instructions that is executable by at least one processor of an electronic device to cause the device to perform an intermediate file processing method for a first client, the method comprising:

sending, to a cluster management client, a message of writing an intermediate file to a first server, so that the cluster management client requests a second server to create the cluster information of the intermediate file;

receiving the cluster information returned by the cluster management client, wherein the cluster information includes a cluster name and a priority level and an expiration time;

sending, to the first server, a request of writing the intermediate file, wherein the request includes the cluster information and the cluster information is verified by the first server; and writing the intermediate file to the first server after the cluster information is successfully verified by the first server, so that the first server writes the intermediate file according to a local disk load and the priority level of the cluster information, wherein the expiration time of the cluster information is updated at an interval of a preset time length, based on a request for extending the expiration time of the cluster information that is periodically sent to the second server, to extend the life cycle of the cluster information.

35. A non-transitory computer readable medium that stores a set of instructions that is executable by at least one processor of an electronic device to cause the device to perform an intermediate file processing method for a second client, the method comprising:

receiving cluster information from a cluster management client, wherein the cluster information is associated with an intermediate file to be written to a first server, is created by a second server under a request from the cluster management client, and includes a cluster name and a priority level and an expiration time;

based on the cluster information, querying from the first server disk write location information for the intermediate file corresponding to the cluster information, wherein the intermediate file is uploaded by a first client to the first server and written by the first server according to a local disk load and the priority level of the cluster information; and reading the intermediate file from the first server according to the write location information, wherein the expiration time of the cluster information is updated at an interval of a preset time length, based on a request for extending the expiration time of the cluster information that is periodically sent to the second server, to extend the life cycle of the cluster information.

36. The non-transitory computer readable medium of claim 35, wherein the cluster information further includes an expiration time, and the set of instructions is executable by the at least one processor of the device to cause the device to further perform:

sending, to the cluster management client, a message indicating that the intermediate file has been successfully read; and updating, by the cluster management client, the expiration time to a current time on the second server, so that the second server deletes the cluster information, and the first server deletes the intermediate file corresponding to the cluster information.

* * * * *